US007588307B2

(12) United States Patent
Hong et al.
(10) Patent No.: US 7,588,307 B2
(45) Date of Patent: Sep. 15, 2009

(54) PIEZOLELECTRIC INKJET PRINTHEAD HAVING TEMPERATURE SENSOR AND METHOD OF MAKING THE SAME

(75) Inventors: Young-ki Hong, Anyang-si (KR); Tae-gyun Kim, Suwon-si (KR); Jae-woo Chung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 392 days.

(21) Appl. No.: 11/341,364

(22) Filed: Jan. 30, 2006

(65) Prior Publication Data

US 2006/0170735 A1 Aug. 3, 2006

(30) Foreign Application Priority Data

Jan. 28, 2005 (KR) ..................... 10-2005-0008003

(51) Int. Cl.
*B41J 29/38* (2006.01)
*B41J 2/045* (2006.01)
*B23P 17/00* (2006.01)

(52) U.S. Cl. .......................... 347/17; 347/70; 29/890.1

(58) Field of Classification Search .................. 347/19, 347/68–72, 17; 438/54
See application file for complete search history.

(56) References Cited

U.S. PATENT DOCUMENTS

| | | | |
|---|---|---|---|
| 5,446,484 A * | 8/1995 | Hoisington et al. | 347/68 |
| 6,149,968 A | 11/2000 | Shimada | |
| 6,660,554 B2 * | 12/2003 | Lavenuta | 438/54 |
| 2004/0051763 A1 * | 3/2004 | Matsubara et al. | 347/68 |

FOREIGN PATENT DOCUMENTS

| | | |
|---|---|---|
| EP | 0 900 657 A2 | 3/1999 |
| EP | 0 900 657 A3 | 3/1999 |
| EP | 1 270 224 A2 | 1/2003 |
| EP | 1 270 224 A3 | 1/2003 |
| EP | 1 431 035 A1 | 6/2004 |
| WO | WO 02/070133 A1 | 9/2002 |

* cited by examiner

*Primary Examiner*—Stephen D Meier
*Assistant Examiner*—Geoffrey Mruk
(74) *Attorney, Agent, or Firm*—Lee & Morse, P.C.

(57) ABSTRACT

A piezoelectric inkjet printhead having a channel forming plate including an ink channel having a pressure chamber coupled to a nozzle, a piezoelectric actuator including a lower electrode on the channel forming plate, a piezoelectric element on the lower electrode, and an upper electrode on the piezoelectric element, the piezoelectric actuator corresponding to the pressure chamber, an insulation element on the lower electrode and spaced apart from the piezoelectric element, a first electrode on the insulation element, and a temperature sensor on the first electrode, and a method of making the same.

23 Claims, 6 Drawing Sheets

PIEZOLELECTRIC INKJET PRINTHEAD HAVING TEMPERATURE SENSOR AND METHOD OF MAKING THE SAME

BACKGROUND OF THE INVENTION

1. Field of the Invention

The present invention relates to a piezoelectric inkjet printhead. More particularly, the present invention relates to a piezoelectric inkjet printhead having a temperature sensor for sensing the temperature of ink in an ink channel, and a method of making the same.

2. Description of the Related Art

In general, an inkjet printhead is a device that prints an image of a predetermined color by ejecting fine ink droplets onto a desired position of a recording medium. Inkjet printheads may be roughly classified into two types of printheads, based on the method of ink ejection. One of the two types of printheads is a thermally-driven type inkjet printhead, which generates a bubble in ink using a heat source and ejects ink using the force of expansion of the bubble. The other type is a piezoelectric inkjet printhead, which operates through the shape transformation of a piezoelectric element and ejects ink using pressure applied to the ink by the transformation of the piezoelectric element.

FIGS. 1 and 2 illustrate partial plan and sectional views, respectively, of a conventional piezoelectric inkjet printhead. Referring to FIGS. 1 and 2, the printhead may include a channel forming plate having a manifold 12 and a plurality of pressure chambers 16, which may be coupled to each other by a plurality of restrictors 14. The printhead may also include a plurality of nozzles 18.

An ink channel may include the manifold 12, a restrictor 14, a pressure chamber 16 and a nozzle 18. In detail, the manifold 12 may serve as a passage supplying ink flowing from an ink storage region (not shown) to each of a plurality of pressure chambers 16, and the plurality of restrictors 14 may serve as passages connecting the manifold 12 with the plurality of pressure chambers 16. The plurality of pressure chambers 16, which fill with ink to be ejected, may be arranged on one side or both sides of the manifold 12.

A plurality of piezoelectric actuators 40 may be provided on the channel forming plate 10. As an individual piezoelectric actuator 40 is driven, it causes a corresponding pressure chamber 16 to change its volume, thereby creating a pressure change for ejecting ink, or for inducing the inflow of ink to the pressure chamber 16 from the manifold 12. A portion of the channel forming plate 10 that constitutes an upper wall, or ceiling, of the pressure chamber 16 may serve as a vibrating plate 20, which is vibrated by driving the piezoelectric actuator 40. The channel forming plate 10 may be manufactured by processing a plurality of thin plates, e.g., silicon wafers, metal plates, synthetic resin plates, etc., to form the features making up the ink channels, and then stacking these plates.

Each piezoelectric actuator 40 may include a lower electrode 41, a piezoelectric element 42, and an upper electrode 43 sequentially stacked on the channel forming plate 10. A lower electrode insulation layer 31 may be formed between the lower electrode 41 and the channel forming plate 10. The lower electrode 41 may be formed on an entire surface of the lower electrode insulation layer 31 to serve as a common electrode for multiple piezoelectric actuators 40. The piezoelectric element 42 may be formed on the lower electrode 41 such that the piezoelectric element 42 is positioned above the corresponding pressure chamber 16. The upper electrode 43 may be formed on the corresponding piezoelectric element 42 to serve as a drive electrode for applying a voltage across the piezoelectric element 42.

To apply a drive voltage to the piezoelectric actuator 40 having the above-described structure, the upper electrode 43 may be connected to a flexible printed circuit (FPC) 50 for voltage supply. The FPC 50 may include a plurality of drive signal lines 51, where individual drive signal lines 51 are bonded to individual upper electrodes 43.

In operation, when the vibrating plate 20 is transformed by driving the piezoelectric actuator 40, the volume of the pressure chamber 16 reduces, which generates a pressure change in the pressure chamber 16 so that ink contained in the pressure chamber 16 is ejected to the outside. Subsequently, when the vibrating plate 20 is restored to an original shape by driving of the piezoelectric actuator 40, the volume of the pressure chamber 16 increases, which generates a pressure change, i.e., a negative pressure change, in the pressure chamber 16, so that ink flows from the manifold 12 into the pressure chamber 16 through the restrictor 14.

When the temperature of ink changes, the viscosity of the ink may also change. If the viscosity of the ink increases, the flow resistance of the ink may also increase, and thus the volume and ejection speed of an ink droplet ejected through the nozzle 18 may be reduced. Therefore, overall ink ejection performance may be reduced and satisfactory printing quality may not be obtained. Accordingly, it may be desirable to provide appropriate compensation for increased ink viscosity by raising the temperature of the ink through heating, or by raising the driving voltage applied to the piezoelectric actuator 40.

To manage this compensation, it may be desirable to accurately sense the temperature of the ink inside the inkjet printhead. However, it may not be straightforward to directly install a temperature sensor for sensing the temperature of ink in the inkjet printhead.

SUMMARY OF THE INVENTION

The present invention is therefore directed to a piezoelectric inkjet printhead having a temperature sensor and a method of making the same, which substantially overcome one or more of the problems due to the limitations and disadvantages of the related art.

It is therefore a feature of an embodiment of the present invention to provide an inkjet printhead having a temperature sensor directly attached thereto.

It is therefore another feature of an embodiment of the present invention to provide a method of making a piezoelectric inkjet printhead, wherein temperature sensor mounting elements may be formed at the same time, and of the same materials, as elements of piezoelectric actuators.

At least one of the above and other features and advantages of the present invention may be realized by providing a piezoelectric inkjet printhead having a channel forming plate including an ink channel having a pressure chamber coupled to a nozzle, a piezoelectric actuator including a lower electrode on the channel forming plate, a piezoelectric element on the lower electrode, and an upper electrode on the piezoelectric element, the piezoelectric actuator corresponding to the pressure chamber, an insulation element on the lower electrode and spaced apart from the piezoelectric element, a first electrode on the insulation element, and a temperature sensor on the first electrode.

The temperature sensor may be a thermistor. The insulation element and the piezoelectric element may be formed of a first material. The first material may be lead zirconate titanate (PZT). The insulation element and the piezoelectric element may be coplanar. The insulation element may have an elongated rectangular shape and may be disposed adjacent to and in parallel with the piezoelectric element.

The first electrode and the upper electrode may be coplanar. The first electrode and the upper electrode may be formed of a second material. The second material may be Ag—Pd. The piezoelectric inkjet printhead may further include a second electrode disposed adjacent to the first electrode, wherein the first and second electrodes are attached to electrodes of the temperature sensor. The first and second electrodes may each have an elongated rectangular shape and may be disposed with long sides thereof opposing each other and in parallel to each other. The insulation element may have the first and second electrodes disposed thereon.

The piezoelectric inkjet printhead may further include a plurality of piezoelectric actuators, wherein the plurality of piezoelectric actuators and the first and second electrodes are disposed parallel to each other and in a same column. The piezoelectric inkjet printhead may further include a set of signal lines provided on a flexible printed circuit, wherein a first subset of the signal lines is coupled to the first electrode and a second subset of the signal lines is coupled to the upper electrode.

At least one of the above and other features and advantages of the present invention may also be realized by providing a method of forming an inkjet printhead having a piezoelectric actuator and a temperature sensor, including forming a lower electrode of the piezoelectric actuator on a channel forming plate, forming an insulation element on a portion of the lower electrode, forming a first electrode on the insulation element, and attaching a temperature sensor on the first electrode.

The temperature sensor may be a thermistor. The method may further include forming a second electrode on the insulation element in parallel with the first electrode, wherein the temperature sensor is attached to the first and second electrodes. Attaching the temperature sensor on the first electrode may include mounting the channel forming plate in a heating block, disposing a solder material between the temperature sensor and the first electrode, placing the temperature sensor on the first electrode, and heating the heating block to melt the solder.

The insulation element and a piezoelectric element of the piezoelectric actuator may be formed of a first material layer. The insulation element may be formed from the first material layer simultaneously with the piezoelectric element. The first electrode and an upper electrode of the piezoelectric actuator may be formed of a second material layer. The first electrode may be formed simultaneously with the upper electrode.

The method may further include bonding a flexible printed circuit to the printhead, the flexible printed circuit including a first signal line coupled to the first electrode and a second signal line coupled to an upper electrode of the piezoelectric actuator.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
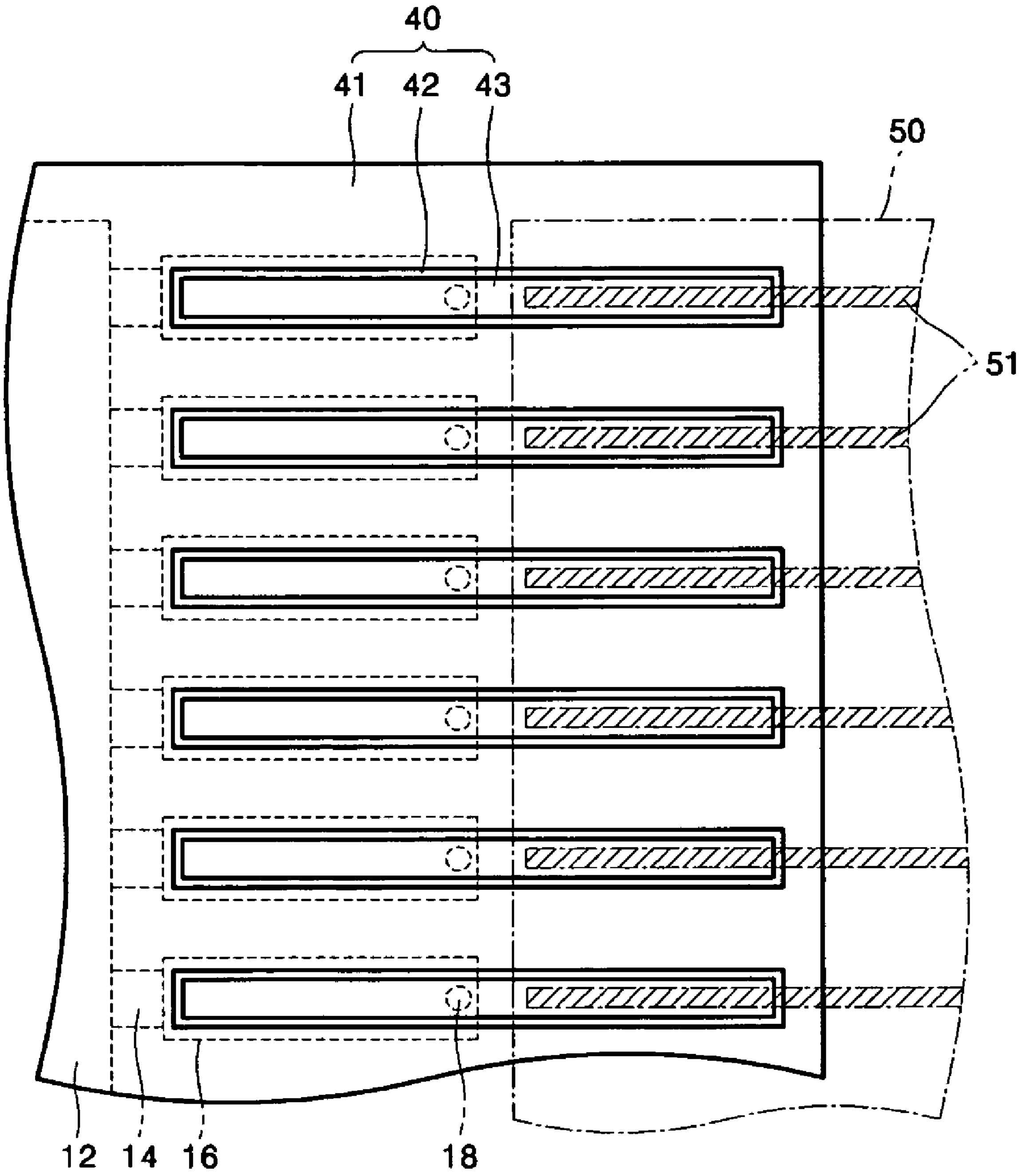
FIG. 1 (PRIOR ART)
FIGS. 1 and 2 illustrate partial plan and sectional views, respectively, of a conventional piezoelectric inkjet printhead.
Figure 2:
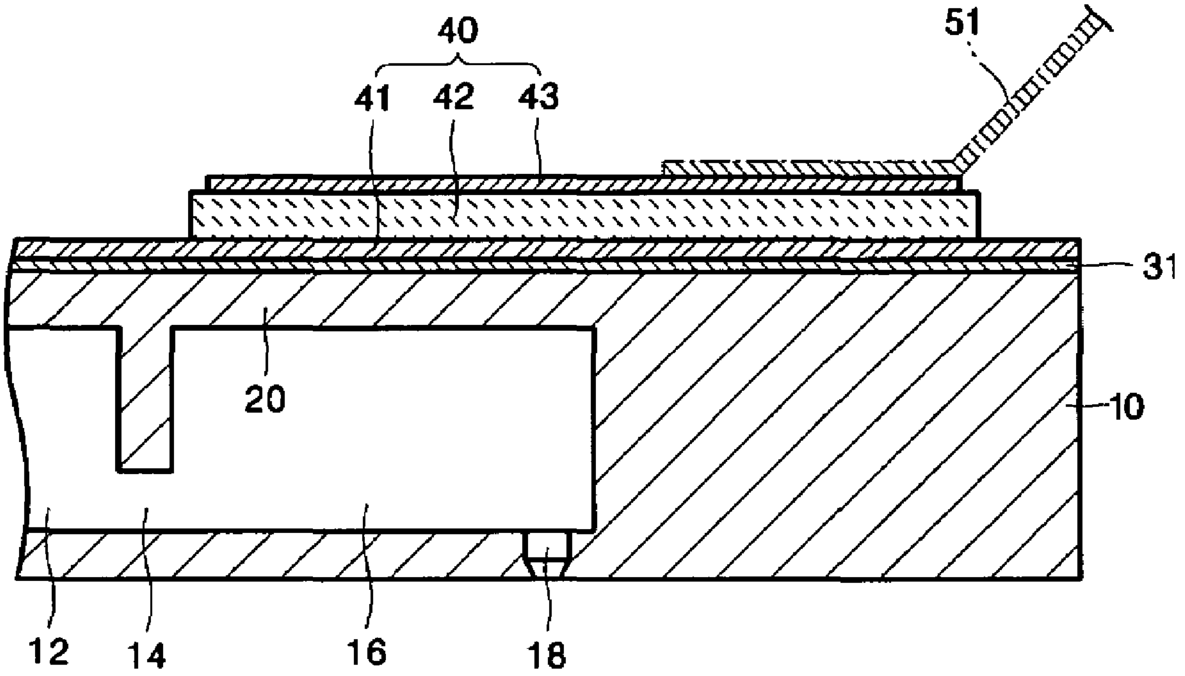
FIG. 2 (PRIOR ART)

Korean Patent Application No. 10-2005-0008003, filed on Jan. 28, 2005, in the Korean Intellectual Property Office, and entitled: "Piezoelectric Inkjet Printhead Having Temperature Sensor And Method of Attaching Temperature Sensor to Inkjet Printhead," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

According to the present invention, a temperature sensor may be directly attached to an inkjet printhead. Thus, it may be possible to more accurately sense the temperature of ink contained in the printhead, thereby enabling active and appropriate compensation depending on the temperature of the ink so that printing quality may be improved.

The temperature sensor may be a thermistor, such that temperature sensor calibration for individual printheads is not required. Temperature sensor mounting elements may be formed at the same time, and of the same materials, as elements of piezoelectric actuators. The temperature sensor may be mounted on the inkjet printhead using a soldering process.

Figure 3:
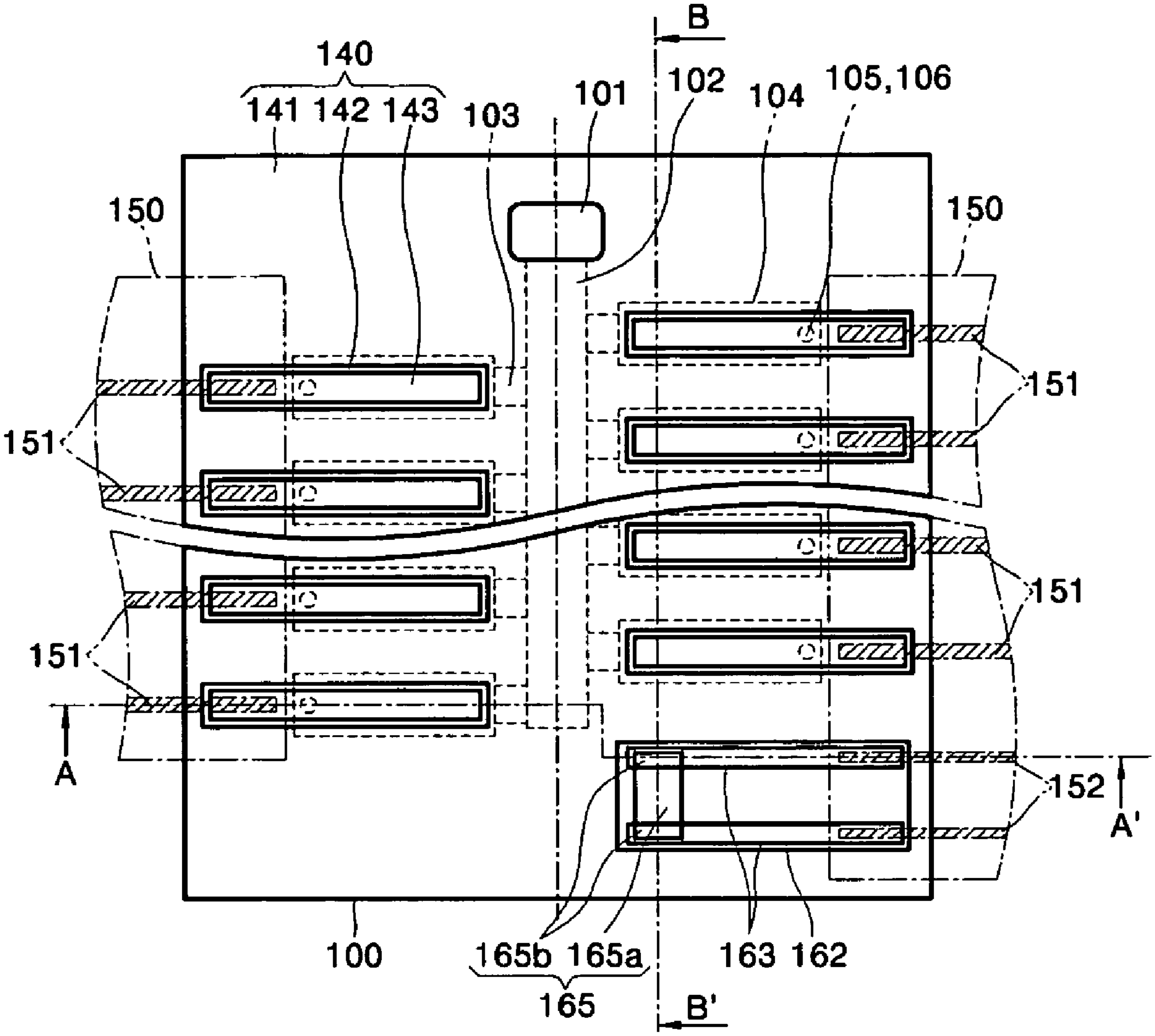
FIG. 3 illustrates a plan view of a piezoelectric inkjet printhead having a temperature sensor according to an embodiment of the present invention.
Figure 4:
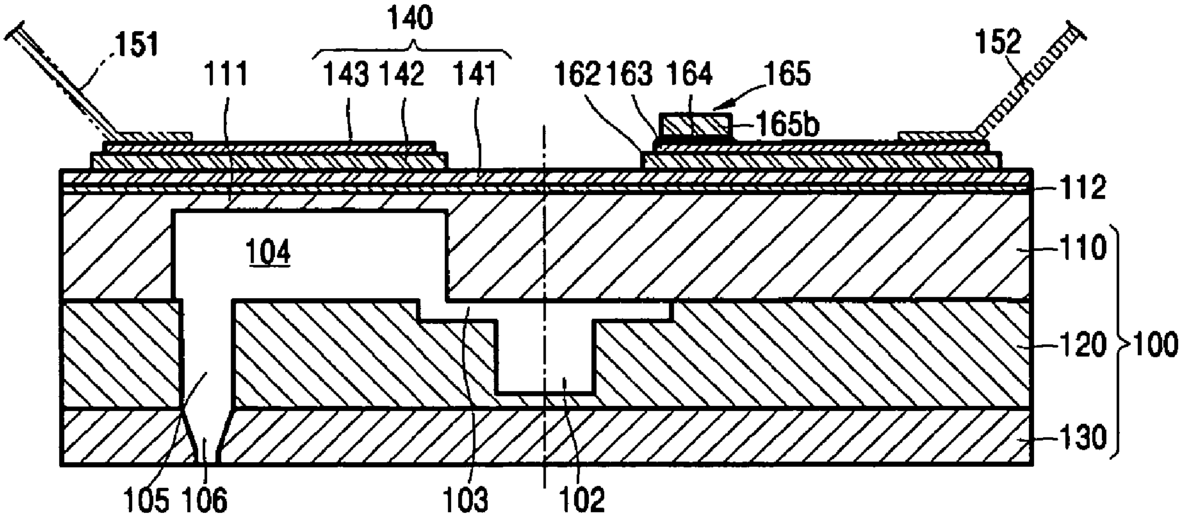
FIG. 4 is a sectional view taken along line A-A' of FIG. 3.

FIG. 3 illustrates a plan view of a piezoelectric inkjet printhead having a temperature sensor according to an embodiment of the present invention, and FIG. 4 is a sectional view taken along line A-A' of FIG. 3. Referring to FIGS. 3 and 4, a piezoelectric inkjet printhead according to the present invention may include a channel forming plate 100 having a plurality of ink channels formed therein, a piezoelectric actuator 140 for providing the driving force required for ejecting ink, and a temperature sensor 165 for sensing the temperature of ink contained in the printhead.

The ink channels may include a plurality of pressure chambers 104, which fill with ink to be ejected and which generate pressure changes for ejecting ink. The ink channels may also include an ink inlet 101, through which ink from an ink storage region (not shown) flows, a manifold 102, which is a common channel supplying the ink from the ink inlet 101 to the pressure chambers 104, a plurality of restrictors 103, which are individual channels supplying ink from the manifold 102 to each of the pressure chambers 104, and a plurality of nozzles 106, for ejecting ink from the pressure chambers 104. A damper 105 may be provided between each of the plurality of pressure chambers 104 and the corresponding nozzles 106, in order to concentrate energy on the nozzles 106 and to buffer sudden pressure changes.

The channel forming plate 100 may include three channel plates 110, 120 and 130. Each of the three channel plates 110, 120 and 130 may be formed of, e.g., a silicon substrate. The three channel plates 110, 120 and 130 may be individually formed, then sequentially stacked and bonded. Where the three channel plates 110, 120 and 130 are silicon substrates, mutual bonding of the three channel plates 110, 120 and 130 may be performed by, e.g., silicon direct bonding (SDB).

In detail, the plurality of pressure chambers 104 may be formed at a predetermined depth in a lower surface of a first channel plate 110, and the ink inlet 101 may be formed to vertically pass through the first channel plate 110. A vibrating plate 111, to be transformed by driving the piezoelectric actuator 140, may be formed at the upper portion of each pressure chamber 104 in the first channel plate 110. Each of the pressure chambers 104 may have an elongated rectangular shape, with a long dimension oriented in the direction of ink flow. The pressure chambers 104 may be arranged in two columns, with one column disposed along each side of the manifold 102, or may be arranged in one column on one side of the manifold 102.

A second channel plate 120 may be bonded to the lower surface of the first channel plate 110. The manifold 102 may be formed in the second channel plate 120. One end of the manifold 102 may be connected to the ink inlet 101. Referring to FIG. 4, the manifold 102 may be formed to a predetermined depth from the upper surface of the second channel plate 120. Alternatively, the manifold 102 may be formed to vertically pass through the second channel plate 120 (not shown). Restrictors 103, which are individual channels connecting the manifold 102 to one end of each of the pressure chambers 104, may be formed in the second channel plate 120. The restrictor 103 may be formed to a predetermined depth from the upper surface of the second channel plate 120, as illustrated in FIG. 4. Alternatively, the restrictor 103 may be formed to vertically pass through the second channel plate 120 (not shown). Dampers 105, connecting each of the pressure chambers 104 to each of the nozzles 106, may be formed in the second channel plate 120 and may be aligned with the other end of each of the pressure chambers 104, opposite the restrictors 103. The dampers 105 may vertically pass through the second channel plate 120.

A third channel plate 130 may be bonded to the lower surface of the second channel plate 120. The plurality of nozzles 106 may be formed in the third channel plate 130. The nozzles 106 may vertically penetrate the third channel plate 130.

The plurality of piezoelectric actuators 140 may be formed on the first channel plate 110 so as to provide each of the corresponding pressure chambers 104 with a driving force for ejecting ink. Each piezoelectric actuator 140 may include a lower electrode 141, serving as a common electrode for multiple piezoelectric actuators 140. Each piezoelectric actuator 140 may also include a piezoelectric element 142, which is transformed when a driving voltage is applied thereto, and an upper electrode 143 serving as a drive electrode. Thus, the piezoelectric actuator 140 may have a structure in which the lower electrode 141, the piezoelectric element 142 and the upper electrode 143 are sequentially stacked.

A lower electrode insulation layer 112 may be formed between the lower electrode 141 and the first channel plate 110. The lower electrode insulation layer 112 may be formed of, e.g., a silicon oxide layer. The lower electrode 141 may be formed on an entire surface of the lower electrode insulation layer 112. The lower electrode 141 may be formed of one conductive metal material layer, or may be formed of two thin metal layers such as, e.g., Ti and Pt. Each piezoelectric element 142 may be formed on the lower electrode 141 and arranged above the corresponding pressure chamber 104. Thus, multiple piezoelectric elements 142 may be formed on the lower electrode 141, such that each of the multiple piezoelectric elements 142 is adjacent to, but separated from, a neighboring piezoelectric element 142, and is coplanar therewith. The piezoelectric elements 142 may be formed from a single layer of material, e.g., a piezoelectric material such as a PZT ceramic material.

A plurality of upper electrodes 143 may be formed on the piezoelectric elements 142, with each upper electrode 143 corresponding to one piezoelectric element 142. The upper electrodes 143 may serve as drive electrodes for applying a driving voltage to the piezoelectric elements 142. Each piezoelectric element 142 may be transformed when the driving voltage is applied thereto, such that deformation of the piezoelectric element 142 warps a vibration plate 111 on each of the pressure chambers 104. To apply the drive voltage to the piezoelectric actuator 140 having the above construction, a drive signal line 151 may be provided, e.g., on a flexible printed circuit 150 (FPC), and bonded to the upper electrode 143.

A temperature sensor 165 for detecting the temperature of ink in the printhead may be provided on the channel forming plate 100. The temperature sensor 165 may be, e.g., a thermistor. The thermistor may be, e.g., an integrated circuit (IC) chip, which may be separately manufactured and then assembled onto the printhead.

Common forms of temperature sensors include resistance temperature detector sensors (RTDs) and thermistors. The RTD uses a temperature sensor, e.g., a metal such as Pt, whose resistance changes significantly with temperature. The thermistor has a similar resistance response to temperature change, but is typically a semiconductor device, e.g., one obtained by mixing and sintering oxides of Mn, Ni, Cu, Co, Cr, Fe, etc. The thermistor is widely used as a temperature sensor, and may be manufactured in various types and used in various ways. For example, the thermistor may be a thermistor chip obtained by forming electrodes on both sides of the thermistor and manufacturing the thermistor in the form of an integrated circuit chip.

In manufacturing inkjet printheads, tens or hundreds of printheads may be manufactured at one time. If RTDs are used as temperature sensors for the printheads, deviations in dimensions of the RTDs may occur, e.g., variations in thickness, width, or length. Accordingly, calibration of each RTD may be required for each of the printheads after the manufacturing of the printheads.

In contrast, the thermistor may be separately manufactured and provided in the form of a chip. Thus, it may have relatively uniform characteristics, obviating the need for calibration of individual printheads. Accordingly, a thermistor may be used as the temperature sensor 165 for measuring the ink temperature. Where a thermistor **165*a* is used as the temperature sensor 165, it may include two electrodes 165*b* formed on two sides thereof and may be provided as a premade chip. The thermistor 165*a*** may be directly attached to the inkjet printhead.

In detail, an insulation element 162 may be formed on the lower electrode 141 on the channel forming plate 100. The insulation element 162 may insulate the lower electrode 141 from an electrode 163 coupled to the temperature sensor 165. The insulation element 162 may be disposed adjacent to, but spaced apart from, a piezoelectric element 142 of a piezoelectric actuator 140. The insulation element 162 may be shaped similarly to the piezoelectric element 142 and may be arranged in parallel to the piezoelectric element 142. The insulation element 162 may be formed on the lower electrode 141 together with the piezoelectric element 142. The insulation element 162 and the piezoelectric element 142 may be formed from a same material layer, e.g., a PZT layer. The insulation element 162 and the piezoelectric element 142 may be formed simultaneously from the same material layer, as described below.

The electrode 163 may be formed on the insulation element 162. Two electrodes 163 may be formed in parallel to each other on the insulation element 162 so as to correspond to two electrodes 165*b* of the temperature sensor 165. The electrode 163 and the upper electrode 143 of the piezoelectric actuator 140 may be formed of a same material layer. The electrode 163 and the upper electrode 143 may be simultaneously formed from the same material layer, as described below.

The temperature sensor 165 may be attached on the electrode 163. For example, two electrodes 165*b* of a thermistor 165*a* may be attached on the two electrodes 163 for temperature sensing, respectively. The electrodes 165*b* may be attached on the two electrodes 163 using, e.g., solder 164, as described below.

Signal lines 152 for temperature sensing may be bonded to each of the electrodes 163. Referring to FIG. 3, a set of signal lines 152 may be provided on a FPC 150 together with a set of drive signal lines 151, which are coupled to the upper electrodes 143 of the piezoelectric actuators 140.

A method of attaching a temperature sensor to an inkjet printhead according to the present invention will now be described with reference to FIGS. 5A-5E, which illustrate partial sectional views, taken along line B-B' of FIG. 3, of stages in a method of making an inkjet printhead according to the present invention.

Figure 5A:
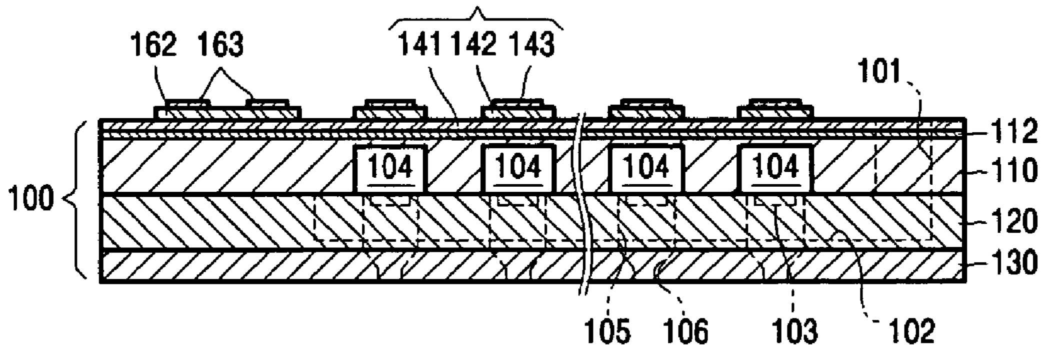
FIGS. 5A-5E illustrate partial sectional views, taken along line B-B' of FIG. 3, of stages in a method of making an inkjet printhead according to the present invention.

Referring to FIG. 5A, a lower electrode 141 of a piezoelectric actuator 140 may be formed on a channel forming plate 100. As described above, the channel forming plate 100 may have a structure including a first channel plate 110, a second channel plate 120, and a third channel plate 130, which may be sequentially stacked and bonded. Each of the first through third channel plates 110, 120 and 130 may be formed of a silicon substrate. An ink channel is formed in the channel forming plate 100 and may include an ink inlet 101, a manifold 102, a plurality of restrictors 103, a plurality of pressure chambers 104, a plurality of dampers 105, and a plurality of nozzles 106. Note, however, that this structure is merely exemplary, and is described in detail merely to provide a full and complete understanding of the present invention.

An insulation layer 112 may be formed between the lower electrode 141 and the channel forming plate 100. The insulation layer 112 may be, e.g., a silicon oxide layer. The lower electrode 141 may be formed on an entire surface of the insulation layer 112. The lower electrode 141 may be formed of one conductive metal material layer, or may be formed of two thin metal layers such as, e.g., Ti and Pt.

After forming the lower electrode 141 on the channel forming plate 100 as described above, an insulation element 162 is formed on a partial portion of the lower electrode 141. The insulation element 162 may be formed of the same material layer, e.g., a PZT layer, as the piezoelectric element 142 of a piezoelectric actuator 140. Thus, the insulation element 162 and the piezoelectric element 142 may be the same material. The insulation element 162 may be simultaneously formed together with the piezoelectric element 142, i.e., a separate process is not required to form the insulation element 162.

In detail, the insulation element 162 and the piezoelectric element 142 may be formed by coating a piezoelectric material layer, e.g., PZT in paste form, to a predetermined thickness on the lower electrode 141 by, e.g., screen printing and drying/sintering the coated piezoelectric material. The piezoelectric material layer may be patterned, e.g., by the screen printing, so that the piezoelectric element 142 is formed above a pressure chamber 104, and the insulation element 162 is formed adjacent to and in parallel with the piezoelectric element 142.

Both the piezoelectric element 142 and the insulation element 162 may have substantially rectangular shapes, with a major length of each being approximately equal. The major sizes of the respective rectangles may be parallel to each other, i.e., they may be disposed adjacent to but spaced apart from each other. A minor length of the insulation element 162 may be longer than the corresponding minor length of the piezoelectric element 142. That is, referring to FIG. 5A, the left-right dimension of the insulation element 162 may be greater than the left-right dimension of the adjacent piezoelectric element 142.

Still referring to FIG. 5A, one or more electrodes 163 for temperature sensing may be formed on the insulation element 162. The electrodes 163 may be formed of the same material as that of an upper electrode 143 of an adjacent piezoelectric actuator 140. The electrodes 163 may be formed simultaneously with the upper electrode 143, and a separate process is not required to form the electrodes 163.

In detail, the electrodes 163 and upper electrode 143 may be formed by, e.g., coating an electrode material layer such as an Ag—Pd paste to a predetermined thickness on the insulation element 162 and the piezoelectric layer 142, respectively, using, e.g., a screen printing process, and sintering the same.

The electrodes 163 may be substantially rectangular and may be formed in parallel to each other on the insulation layer 162. The electrodes 163 may have a major length approximately equal to a corresponding major length of an adjacent upper electrode 143, or may be aligned with ends substantially even with the adjacent upper electrode 143. That is, referring to FIG. 3, the ends of the electrodes 163 and the end of the adjacent upper electrode 143 may be aligned, e.g., near the right edge of the printhead in FIG. 3. Thus, a FPC may be easily coupled to both the electrodes 163 and the upper electrodes 143 of the piezoelectric actuators 140, as will be described below.

As described above, a piezoelectric element 142 and an upper electrode 143 may be formed on the channel forming plate 100 simultaneously with an insulation element 162 and an electrode 163, respectively. Accordingly, the manufacture of the inkjet printhead may be simplified.

Figure 5B:
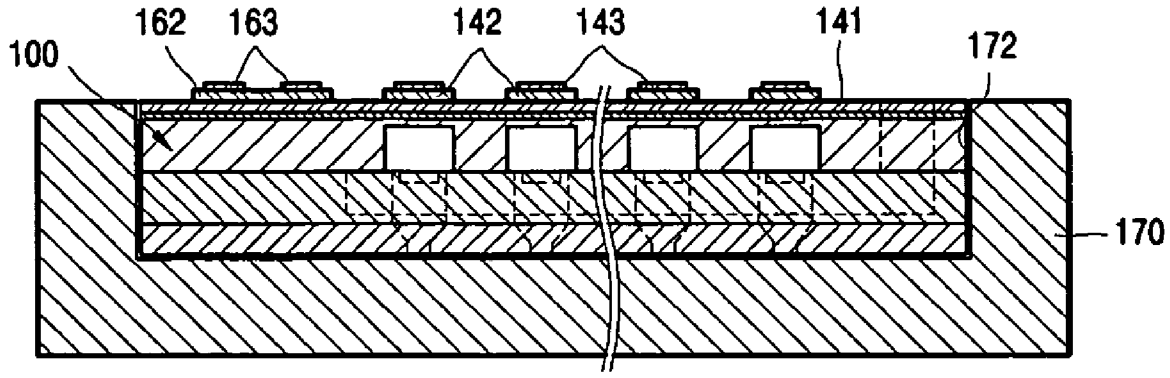

Referring now to FIG. 5B, the channel forming plate 100 may be mounted in a heating block 170. A groove or recess 172 for receiving the channel forming plate 100 may be formed in the upper surface of the heating block 170. With the channel forming plate 100 mounted in the heating block 170, a process may be performed to attach the temperature sensor 165 to the electrode(s) 163.

Figure 5C:
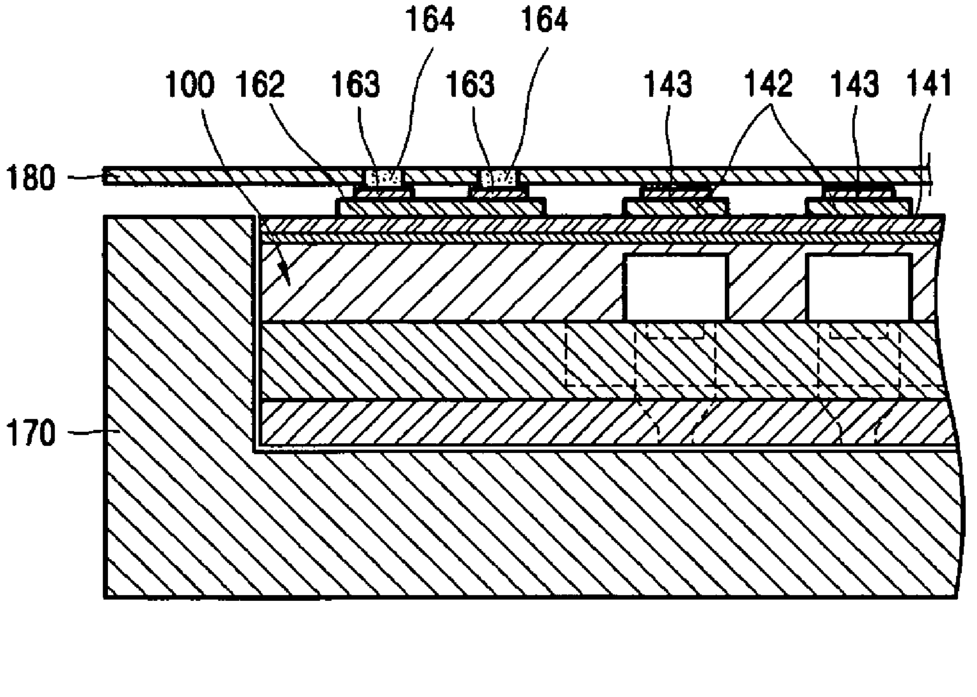

In detail, referring to FIG. 5C, solder 164 may be disposed on the electrodes 163. The solder 164 may be formed by, e.g., printing a predetermined solder material on the electrodes 163 using, e.g., a printing mask 180, or by dispensing a predetermined solder material using a dispenser. The type of solder and methods of application thereof may be of the same kinds typically used for semiconductor manufacturing.

Figure 5D:
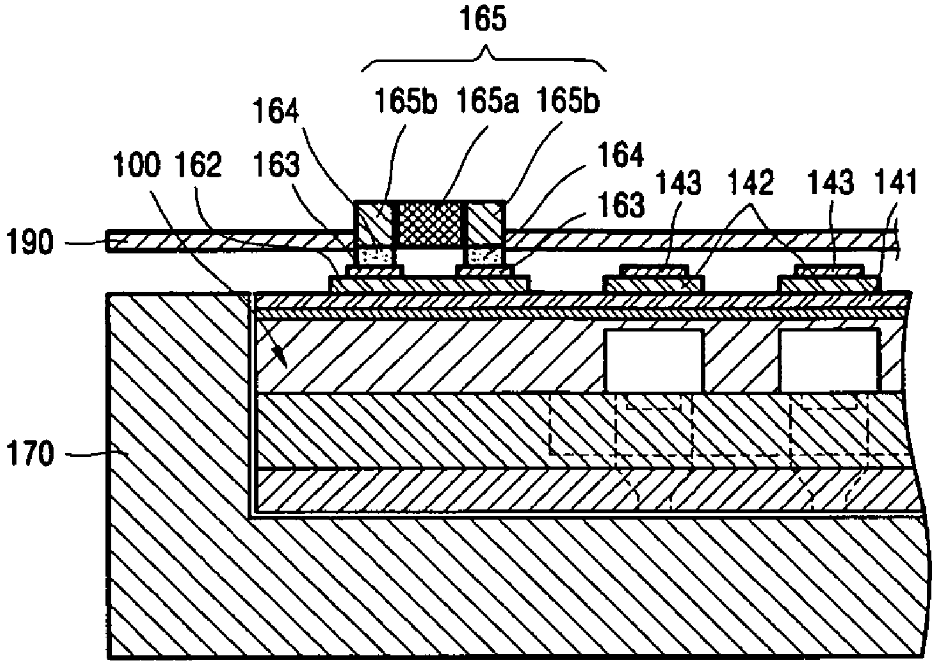

Referring to FIG. 5D, the temperature sensor 165, e.g., a thermistor, may be positioned on the solder 164, such that electrodes 165*b* of the temperature sensor 165 are in contact with the solder 164. The positioning of the thermistor chip 165 may be performed using, e.g., a positioning mask 190, or by using a pick and place device as is commonly used for semiconductor manufacturing.

Figure 5E:
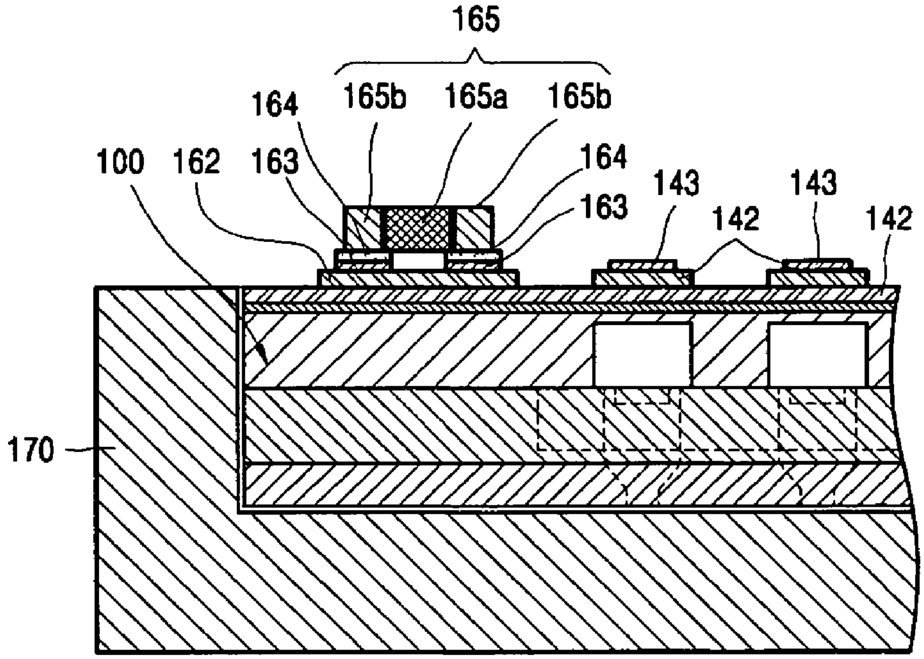

Referring to FIG. 5E, the solder 164 may be heated, e.g., to about 200° C., so that a reflow process is performed on the solder 164. Of course, the heating temperature of the solder 164 may change depending on the type of solder used. Heating of the solder 164 may be indirectly performed by heating the heating block 170. Alternatively, the heating of the solder 164 may be performed within a heating oven, in which case the heating block 170 illustrated in FIGS. 5B-5E need not be used. After the solder 164 is reflowed by heating, the solder 164 is cooled down. The cooling of the solder 164 may be performed by natural cooling. Thus, the above process may be used to attach electrodes 165*b* of the temperature sensor 165 on the electrodes 163.

Referring now to FIGS. 3 and 4, signal lines 152 for temperature sensing may be bonded to each of the electrodes 163. The signal lines 152 may be provided as part of a FPC 150, and may be provided together with a set of drive signal lines 151 for the piezoelectric actuators 140. The drive signal lines 151 may be bonded to the upper electrodes 143 of the piezoelectric actuators 140 simultaneously with bonding of the signal lines 152 to the electrodes 163.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A piezoelectric inkjet printhead, comprising:

a channel forming plate including an ink channel having a pressure chamber coupled to a nozzle;

a piezoelectric actuator including a lower electrode on the channel forming plate, a piezoelectric element on the lower electrode, and an upper electrode on the piezoelectric element, the piezoelectric actuator corresponding to the pressure chamber;

an insulation element on the lower electrode and spaced apart from the piezoelectric element;

a first electrode on the insulation element; and a temperature sensor for sensing a temperature of ink in the ink channel, the temperature sensor being on the first electrode.

2. The piezoelectric inkjet printhead as claimed in claim 1, wherein the temperature sensor is a thermistor.

3. The piezoelectric inkjet printhead as claimed in claim 1, wherein the insulation element and the piezoelectric element are formed of a first material.

4. The piezoelectric inkjet printhead as claimed in claim 3, wherein the first material is PZT.

5. The piezoelectric inkjet printhead as claimed in claim 1, wherein the insulation element and the piezoelectric element are coplanar.

6. The piezoelectric inkjet printhead as claimed in claim 5, wherein the insulation element has an elongated rectangular shape and is disposed adjacent to and in parallel with the piezoelectric element.

7. The piezoelectric inkjet printhead as claimed in claim 1, wherein the first electrode and the upper electrode are coplanar.

8. The piezoelectric inkjet printhead as claimed in claim 1, wherein the first electrode and the upper electrode are formed of a second material.

9. The piezoelectric inkjet printhead as claimed in claim 8, wherein the second material is Ag—Pd.

10. The piezoelectric inkjet printhead as claimed in claim 1, further comprising a second electrode disposed adjacent to the first electrode, wherein the first and second electrodes are attached to electrodes of the temperature sensor.

11. The piezoelectric inkjet printhead as claimed in claim 10, wherein the first and second electrodes each have an elongated rectangular shape and are disposed with long sides thereof opposing each other and in parallel to each other.

12. The piezoelectric inkjet printhead as claimed in claim 10, wherein the insulation element has the first and second electrodes disposed thereon.

13. The piezoelectric inkjet printhead as claimed in claim 10, further comprising a plurality of piezoelectric actuators, wherein the plurality of piezoelectric actuators and the first and second electrodes are disposed parallel to each other and in a same column.

14. The piezoelectric inkjet printhead as claimed in claim 1, further comprising a set of signal lines on a flexible printed circuit, wherein a first subset of the signal lines is coupled to the first electrode and a second subset of the signal lines is coupled to the upper electrode.

15. A method of forming an inkjet printhead having a temperature sensor, the method comprising:

forming a lower electrode of a piezoelectric actuator on a channel forming plate, the channel forming plate including an ink channel having a pressure chamber coupled to a nozzle, and the piezoelectric actuator corresponding to the pressure chamber;

forming a piezoelectric element on the lower electrode;

forming an upper electrode on the piezoelectric element;

forming an insulation element on a portion of the lower electrode and spaced apart from the piezoelectric element;

forming a first electrode on the insulation element; and attaching a temperature sensor, for sensing a temperature of ink in the ink channel, on the first electrode.

16. The method as claimed in claim 15, wherein the temperature sensor is a thermistor.

17. The method as claimed in claim 15, further comprising forming a second electrode on the insulation element in parallel with the first electrode, wherein the temperature sensor is attached to the first and second electrodes.

18. The method as claimed in claim 15, wherein attaching the temperature sensor on the first electrode comprises:

mounting the channel forming plate in a heating block;

disposing a solder material between the temperature sensor and the first electrode;

placing the temperature sensor on the first electrode; and heating the heating block to melt the solder.

19. The method as claimed in claim 15, wherein the insulation element and a piezoelectric element of the piezoelectric actuator are formed of a first material layer.

20. The method as claimed in claim 19, wherein the insulation element is formed from the first material layer simultaneously with the piezoelectric element.

21. The method as claimed in claim 15, wherein the first electrode and an upper electrode of the piezoelectric actuator are formed of a second material layer.

22. The method as claimed in claim 21, wherein the first electrode is formed simultaneously with the upper electrode.

23. The method as claimed in claim 15, further comprising bonding a flexible printed circuit to the printhead, the flexible printed circuit including a first signal line coupled to the first electrode and a second signal line coupled to an upper electrode of the piezoelectric actuator.

* * * * *